United States Patent
Chen et al.

(10) Patent No.: US 10,198,054 B2
(45) Date of Patent: Feb. 5, 2019

(54) POWER SUPPLY DEVICE

(71) Applicants: Ching-Hua Chen, Taipei (TW); Hung-Wei Lin, Taipei (TW)

(72) Inventors: Ching-Hua Chen, Taipei (TW); Hung-Wei Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 805 days.

(21) Appl. No.: 14/526,549

(22) Filed: Oct. 29, 2014

(65) Prior Publication Data

US 2015/0115712 A1 Apr. 30, 2015

(30) Foreign Application Priority Data

Oct. 31, 2013 (TW) .............................. 102139588 A

(51) Int. Cl.
*G06F 1/26* (2006.01)
*G06F 1/30* (2006.01)

(52) U.S. Cl.
CPC .................. *G06F 1/30* (2013.01); *G06F 1/26* (2013.01); *G06F 1/263* (2013.01); *H01M 2220/10* (2013.01); *Y10T 307/344* (2015.04)

(58) Field of Classification Search
CPC .... G06F 1/30; G06F 1/263; H02J 9/06; H02J 9/061; Y10T 307/344; H01M 2220/10
See application file for complete search history.

(56) References Cited

U.S. PATENT DOCUMENTS

| 6,018,456 | A | * | 1/2000 | Young | G06F 1/181 361/679.4 |
|---|---|---|---|---|---|
| 7,397,671 | B2 | * | 7/2008 | Cleveland | G06F 1/184 361/679.55 |
| 7,414,854 | B1 | * | 8/2008 | Douglas | G06F 1/188 361/752 |
| D631,835 | S | | 2/2011 | Neidhart | |
| 7,989,969 | B2 | * | 8/2011 | Grant | F02B 63/04 290/1 A |
| D654,016 | S | | 2/2012 | Neidhart | |

(Continued)

FOREIGN PATENT DOCUMENTS

| CN | 2558088 | 6/2003 |
|---|---|---|
| CN | 201360273 | 12/2009 |

(Continued)

OTHER PUBLICATIONS

Gordon, "How to Build a Computer, Lesson 3: Building the Computer", Aug. 2011, retrieved from http://lifehacker.com/5827491/how-to-build-a-computer-from-scratch-lesson-3-building-the-computer.*

*Primary Examiner* — Ryan Johnson
(74) *Attorney, Agent, or Firm* — JCIPRNET

(57) ABSTRACT

A power supply device includes a first body and a second body. The first body has an opening and an adapter module which is electrically connected to a first electronic device. The opening is divided into a first part and a second part via a first axis, and the shape of the first part is asymmetrical to the shape of the second part. The second body has an energy storage unit. The energy storage unit is electrically connected to the adapter module to supply power to the first electronic device, when the second body is detached from the first body, the energy storage unit is adapted to supply power to a second electronic device.

8 Claims, 5 Drawing Sheets

(56) References Cited

U.S. PATENT DOCUMENTS

| | | | |
|---|---|---|---|
| D671,493 S | 11/2012 | Hasbrook et al. | |
| 2011/0107120 A1* | 5/2011 | Nakashima | H01M 10/44 713/300 |
| 2013/0326237 A1* | 12/2013 | Holdengreber | G06F 1/26 713/300 |
| 2015/0378415 A1* | 12/2015 | George | G06F 1/30 307/64 |

FOREIGN PATENT DOCUMENTS

| | | |
|---|---|---|
| CN | 202025812 | 11/2011 |
| TW | 201005473 | 2/2010 |
| TW | M400015 | 3/2011 |
| TW | M449984 | 4/2013 |
| TW | D153315 | 5/2013 |
| TW | D154045 | 6/2013 |

\* cited by examiner

POWER SUPPLY DEVICE

CROSS-REFERENCE TO RELATED APPLICATION

This application claims the priority benefit of TW application serial no. 102139588, filed on Oct. 31, 2013. The entirety of the above-mentioned patent application is hereby incorporated via reference herein and made a part of specification.

BACKGROUND OF THE INVENTION

Field of the Invention

This disclosure relates to a power supply device and, more particularly to a portable power supply device.

Description of the Related Art

A power supply in a desktop computer provides power to all components in a desktop computer. The power supply converts alternating current (AC) main power voltage to direct current (DC) voltage for the desktop computer. When the main power AC voltage is unstable or be cut off and the power supply thus fails, the computer system may shutdown which causes important data damage. Consequently, an uninterruptible power supply (UPS) is generally conducted the desktop computer. When the main power voltage is normal, the desktop computer is supplied via the main power. When the main power is abnormal, the desktop computer is supplied via the UPS.

Furthermore, with the popularity of portable electronic devices such as a tablet PC and a smart phone, a portable power supply is widely used. Moreover, the portable power supply is more convenient to adapt to further applications.

BRIEF SUMMARY OF THE INVENTION

A power supply device provided in this disclosure is adapted to supply power to a first electronic device or a second electronic device. The power supply device includes a first body and a second body. The first body includes an opening and an adapter module. The adapter module is electrically connected to the first electronic device. The opening is divided to a first part and a second part along a first axis, and the shape of the first part is not symmetrical to that of the second part. The second body includes an energy storage unit. The shape of a section of the second body is corresponding to the shape of the opening. The second body passes through the opening along a direction vertical to the section to be disposed in the first body, and the energy storage unit is electrically connected to the adapter module and supplies power to the first electronic device via the adapter module. When the second body is detached from the first body, the energy storage unit supplies power to the second electronic device.

The adapter module is adapted to the power supply device, the power supply device includes a first body and a second body, the adapter module includes a first circuit board and a second circuit board. The second circuit board includes a plurality of ports and is electrically connected to the first circuit board. The first circuit board is parallel to the second circuit board, and the first circuit board overlaps the second circuit board partially. The second body can be put into the first body, so as to make the energy storage unit connected to the second circuit board to supply power to the first electronic device via the adapter module. When the second body is detached from the first body, the power supply is adapted to supply power to the second electronic device.

The power supply device is adapted to supply power to a first electronic device or a second electronic device. The power supply device includes a first body and a second body. The first body is disposed in the first electronic device and includes an adapter module. The adapter module is electrically connected to the first electronic device and includes a first circuit board and a second circuit board. The first circuit board is parallel to the second circuit board, and the first circuit board overlaps the second circuit board partially. The second body includes a energy storage unit, and the second body can be put into the first body, so as to make the energy storage unit electrically connected to the second circuit board to supply power to the first electronic device via the adapter module. When the second body is detached from the first body, the energy storage unit is adapted to supply power to the second electronic device.

When the second body is integrated with the first body, the energy storage unit of the second body can supply power to the first electronic device via the adapter module of the first body. At the time, the power supply device is equivalent to the uninterruptible power supply of the first electronic device. Moreover, when the second body is detached from the first body, the second body is portable and adapted to supply power to the second electronic device. At the time, the power supply device is equivalent to the portable power supply. Consequently, the power supply device is a multi-functional power supply device of integrating the functions of the uninterruptible power supply and the portable power supply.

DETAILED DESCRIPTION OF THE EMBODIMENTS

Figure 1:
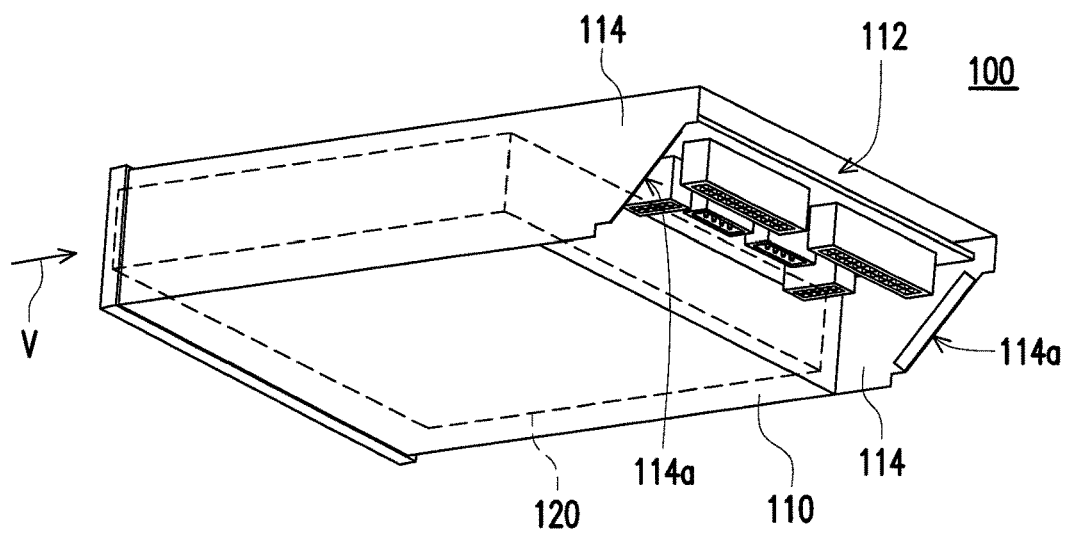
FIG. 1 is a three-dimensional schematic diagram showing a power supply device in an embodiment.
Figure 2:
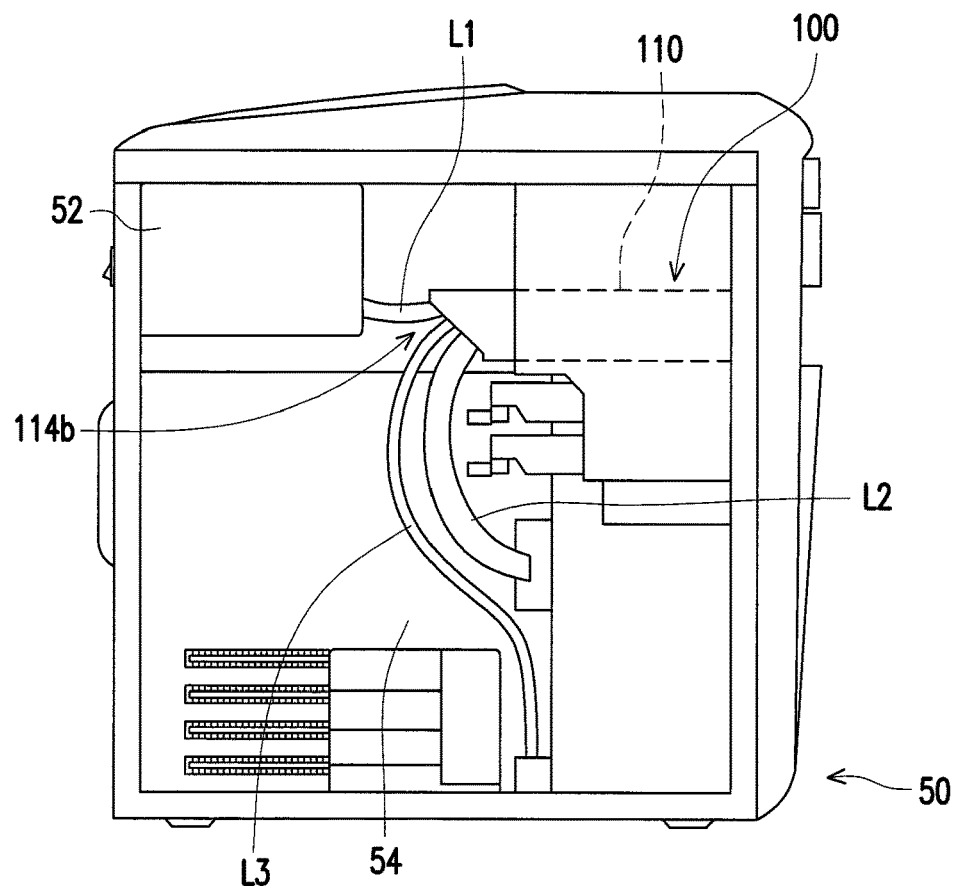
FIG. 2 is a schematic diagram showing that the power supply device in FIG. 1 is applied to a desktop computer.

FIG. 1 is a three-dimensional diagram showing a power supply device in one embodiment. FIG. 2 is a schematic diagram showing the power supply device applied to a desktop computer in FIG. 1. As shown in FIG. 1 and FIG. 2, the power supply device 100 in this embodiment includes a first body 110 and a second body 120.

The first body 110 is disposed in the first electronic device 50 and includes an adapter module 112, and the first electronic device 50 (such as a desktop computer) includes a power supply 52 inside. The adapter module 112 is electrically connected to the power supply 52 and a motherboard the 54 of the first electronic device 50. The power supply 52 receives power from a main power and provides power to the first electronic device 50.

Figure 3:
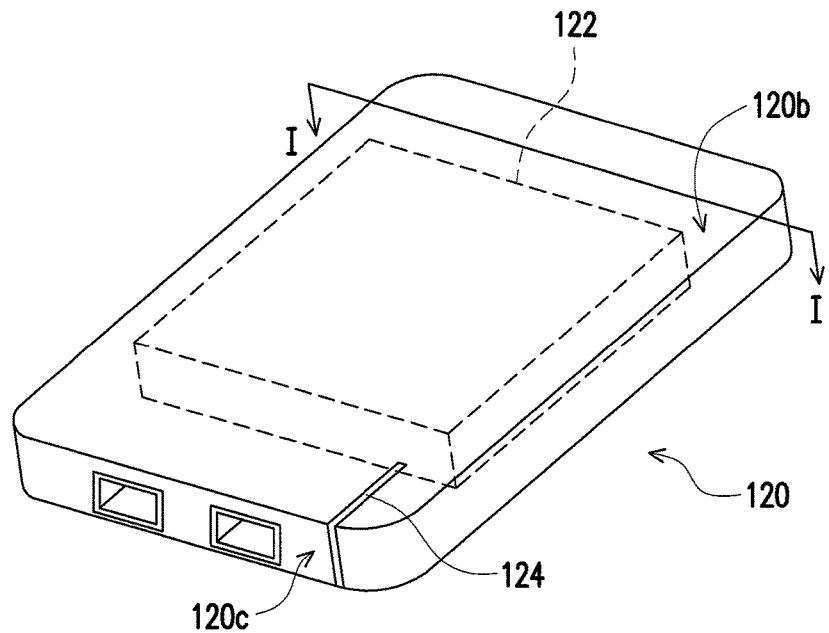
FIG. 3 is a three-dimensional schematic diagram showing a second body of the power supply device in FIG. 1.

FIG. 3 is a three-dimensional schematic diagram showing a second body of the power supply device in FIG. 1. As shown in FIG. 3, the second body 120 includes an energy storage unit 122, and the second body 120 is adapted to be connected with the first body 110 to make the energy storage unit 122 electrically connected to the adapter module 112 in FIG. 2 to supply power to the first electronic device 50. The adapter module 112 is used to raise or reduce the voltage provided by the energy storage unit 122 to supply a voltage corresponding to the first electronic device 50.

When the main power fails and the power supply 52 stops to supply power to the first electronic device 50, the energy storage unit 122 in the second body 120 supplies power to the first electronic device 50, and thus the user has enough time to end the operating work of the first electronic device 50. At the time, the power supply device is used as an uninterruptible power supply of the first electronic device 50.

Figure 4:
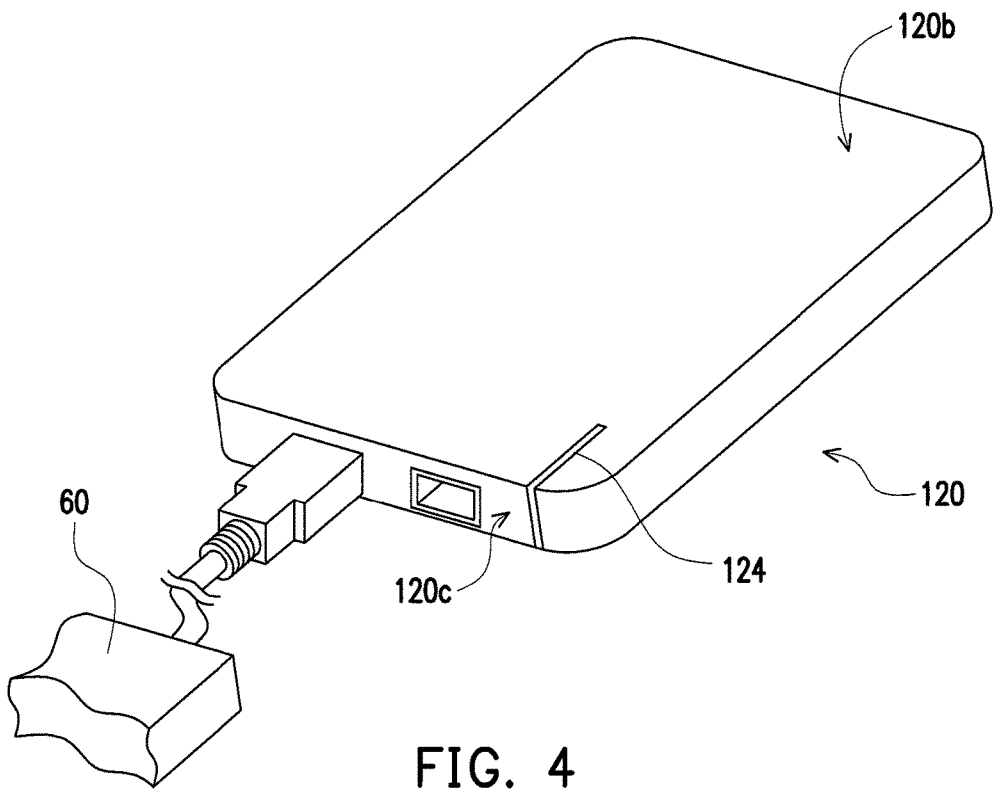
FIG. 4 is a schematic diagram showing that the second body in FIG. 3 supplies power to the second electronic device.

FIG. 4 is a schematic diagram showing that the second body in FIG. 3 supplies power to the second electronic device. When the second body 120 is detached from the first body 110, the second body 120 is adapted to supply power to the second electronic device 60 (such as a portable device), and it is used as a portable power supply.

Figure 5:
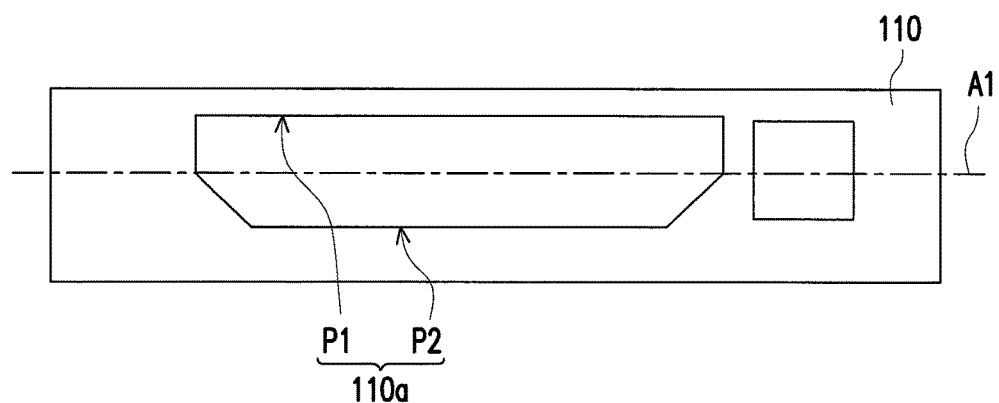
FIG. 5 is a front view of a first body of the power supply device in FIG. 1 along a viewing angle V.
Figure 6:
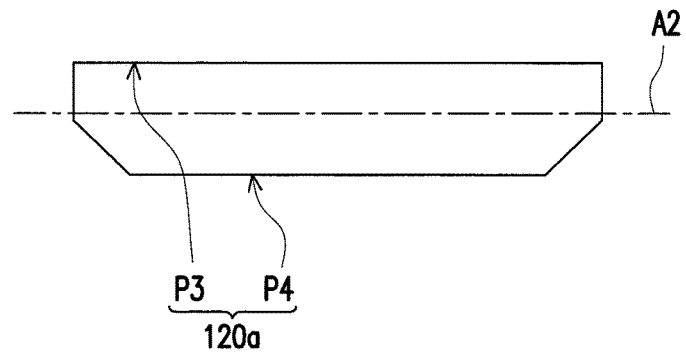
FIG. 6 is a schematic diagram showing a section of the second body in FIG. 3 along a line I-I.

FIG. 5 is a front view showing the first body in FIG. 1 along a view angle V. FIG. 6 is a schematic diagram showing a section of the second body in FIG. 3 along a line I-I. As shown in FIG. 5 and FIG. 6, the first body 110 in this embodiment includes an opening 110a, and the shape of the section 120a of the second body 120 is corresponding to the shape of the opening 110a of the first body 110. The second body 120 is adapted to pass through the opening 110a along a direction vertical to the section 120a, and then disposed in the first body 110.

Moreover, the opening 110a of the first body 110 is divided to a first part P1 and a second part P2 via a first axis A1, the shape of the first part P1 is asymmetrical to the shape of the second part P2. A second axis A2 divides the section 120a of the second body 120 to a third part P3 and a fourth part P4, the shape of the third part P3 is asymmetrical to that of the fourth part P4, and the shapes of the third part P3 and the fourth part P4 are corresponding to the shapes of the first part P1 and the second part P2 of the opening 110a.

When the third part P3 of the section 120a of the second body 120 is combined to the second part P2 of the opening 110a, since the shapes of the second part P2 and the third part P3 are different, the second body 120 cannot be combined into the first body 110. Consequently, the third part P3 and the fourth part P4 of the section 120a of the second body 120 should be put to correspond to the first part P1 and the second part P2 of the opening 110a, respectively, so as to make the second body 120 disposed in the first body 110. Consequently, it can avoid that the second body 120 is combined with the first body 110 in a wrong way.

In this embodiment, the shapes of the first part P1 and the third part P3 may be rectangular, the shapes of the second part P2 and the fourth part P4 may be trapezoidal, which is not limited herein. The first part P1, the second part P2, the third part P3 and the fourth part P4 may have other shapes, and the shapes of the first part P1 and the third part P3 are different from that of the second part P2 and the fourth part P4.

Figure 7:
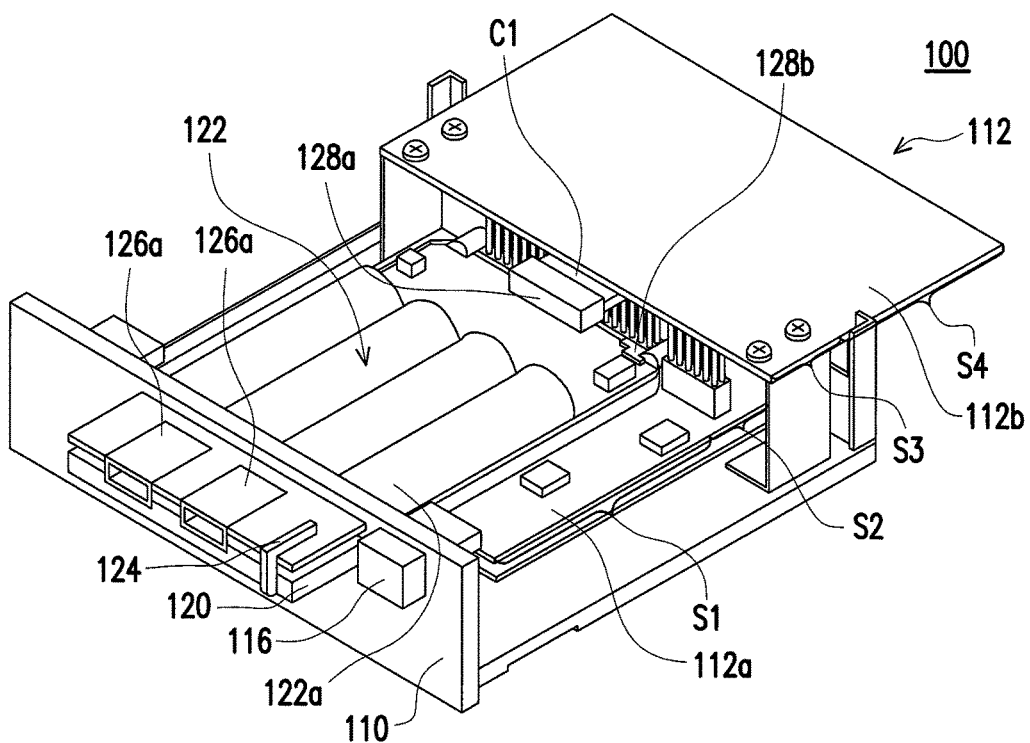
FIG. 7 is a three-dimensional schematic diagram showing partial elements in the power supply device in FIG. 1.
Figure 8:
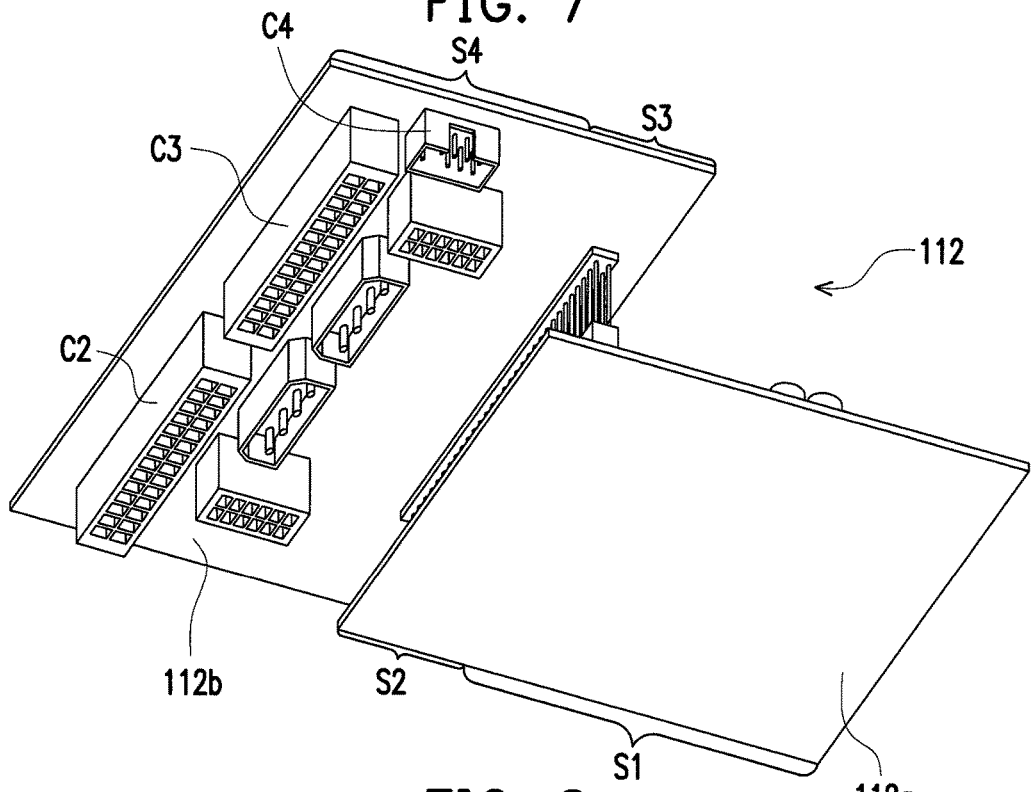
FIG. 8 is a three-dimensional schematic diagram showing an adapter module in an embodiment.

FIG. 7 is a three-dimensional schematic diagram showing partial elements of the power supply device of FIG. 1. FIG. 8 is a three-dimensional schematic diagram showing an adapter module. As shown in FIG. 7 and FIG. 8, the adapter module 112 includes a first circuit board 112a and a second circuit board 112b. The first circuit board 112a is parallel to the second circuit board 112b, and the first circuit board 112a overlaps the second circuit board 112a partially.

Moreover, the first circuit board 112a includes a first region S1 and a second region S2, and the second circuit board 112b includes a third region S3 and a fourth region S4. The first region S1 does not overlap the second circuit board 112b, the second region S2 overlaps the third region S3, and the fourth region S4 does not overlap the first circuit board 112a. As shown in FIG. 1 and FIG. 7, when the second body 120 is disposed in the first body 110, the first region S1 of the first circuit board 112a bears the second body 120, and the energy storage unit 122 of the second body 120 is connected to the first port C1 of the third region S3 to make the energy storage unit 122 electrically connected to the adapter module 112.

Furthermore, as shown in FIG. 7, the distance between the second region S2 and the third region S3 is larger than the thickness of the second body 120. Thus, when the second body 120 is disposed in the first body 110, a portion of the second body 120 is disposed between the second region S2 and the third region S3.

As shown in FIG. 2 and FIG. 8, the second circuit board 112b of the adapter module 112 includes a second port C2, a third port C3 and a fourth port C4. The second port C2 is electrically connected to the power supply 52 of the first electronic device 50 via a first power cable L1, the port C3 is electrically connected to the motherboard 54 of the first electronic device 50 via a second power cable L2, and the fourth port C4 is electrically connected to the motherboard 54 of the first electronic device 50 via a signal cable L3.

When the main power operates normally, the power supply 52 of the first electronic device 50 supplies power to the motherboard 54 via the first power cable L1 and the second power cable L2, and it also can charge the energy storage unit 112 via the first power cable L1. When the main power operates abnormally and the power supply 52 cannot supply power, the motherboard 54 transmits a signal to the adapter module 112 via the signal cable L3 to make the energy storage unit 122 (as shown in FIG. 3 and FIG. 7) of the second body 120 begin to charge the motherboard 54.

As shown in FIG. 1, the first body 110 includes two opposite side plates 114, and the adapter module 112 is disposed between two side plates 114. Each of the side plates 114 includes a beveling 114a to form a concessive notch 114b (as shown in FIG. 2), and then the first power cable L1, the second power cable L2 and the signal cable L3 can extend out the first body 110 from the concessive notch 114b successfully.

As shown in FIG. 3 and FIG. 4, in this embodiment, the second body 120 includes a top surface 120b, a front surface 120c and a battery indicator 124. The battery indicator 124 extends from the top surface 120b to the front surface 120c. When the second body 120 is disposed in the first body 110, the first body 110 covers the top surface 120b of the second body 120, and the front surface 120c of the second body 120 is exposed, the battery indicator 124 disposed at the front surface 120c is visible, and then the user can get the power status of the second body 120.

Figure 9:
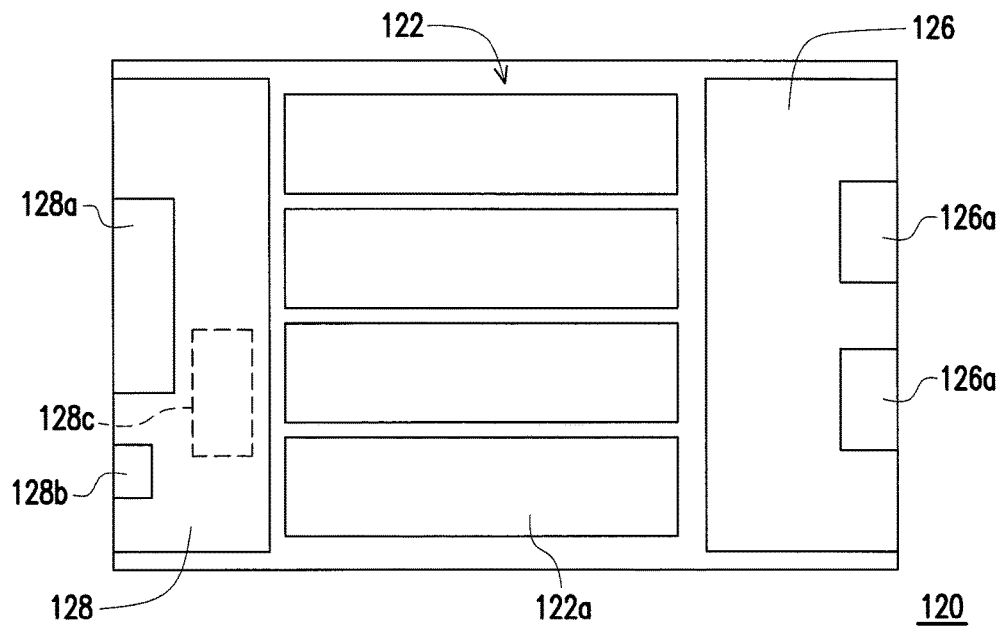
FIG. 9 is a top view of the second body in an embodiment.

FIG. 9 is a top view of the second body in FIG. 7. As shown in FIG. 7 and FIG. 9, the second body 120 includes a first adapter plate 126 electrically connected to the energy storage unit 122 and at least one first connecting port 126a (two ports are shown in FIG. 9 for example). When the second body 120 is detached from the first body 110 to be used as a portable power supply, the energy storage unit 122 is adapted to provide power to the second electronic device 60 via the first connecting port 126a.

Additionally, the second body 120 further includes a second adapter plate 128 electrically connected to the energy storage unit 122, and the second adapter plate 128 includes a second connecting port 128a. The energy storage unit 122 is adapted to be connected to the first port C1 (as shown in FIG. 7) of the adapter module 112 via the second connecting port 128a. The second adapter plate 128 further includes a power supply port 128b, and the external power supply terminal (such as main power) is adapted to provide power to the energy storage unit 122 via the port power supply 128b to allow the external power supply terminal to charge the energy storage unit 122 when the stored power is exhausted. The second adapter plate 128 in this embodiment further includes a protection circuit 128c to stop supplying power from the energy storage unit 122 when the status of the energy storage unit 122 is abnormal.

In this embodiment, the energy storage unit 122 may be constituted of a plurality of lithium batteries 122a (four as shown), and a lithium battery of larger power capacity may be selected according to the demand on the first electronic device 50 and the second electronic device 60. The energy storage unit 122 is not limited herein.

Figure 10:
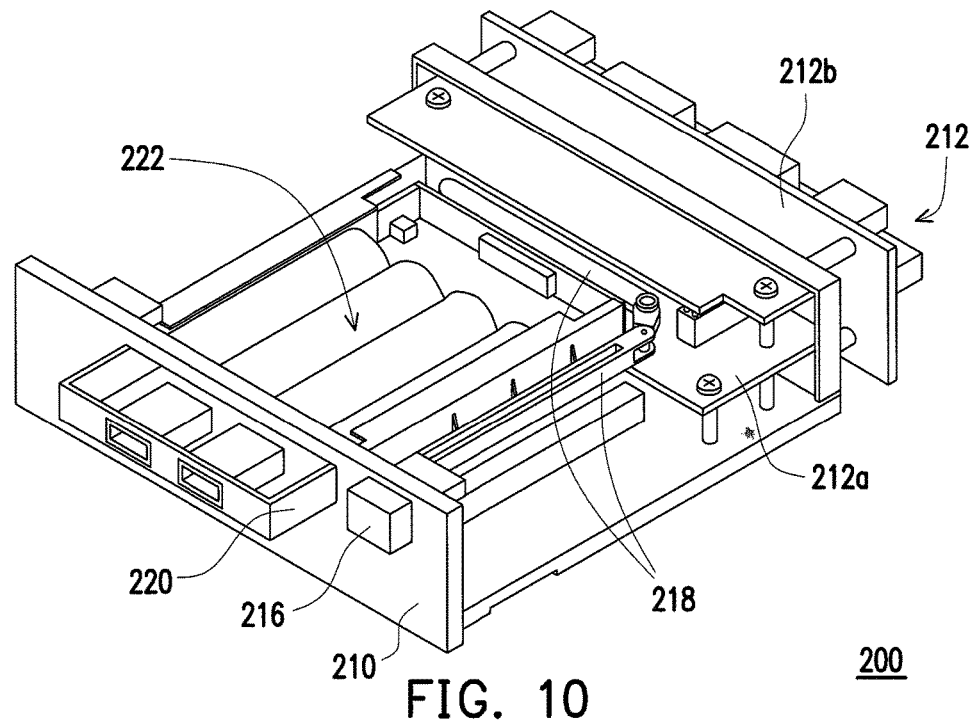
FIG. 10 is a three-dimensional schematic diagram showing partial components of a power supply device in another embodiment.

FIG. 10 is a three-dimensional schematic diagram showing partial elements of a power supply device in another embodiment. In the power supply device 200 as shown in FIG. 10, the configuration and the operation of the first body 210, the second body 220 and the energy storage unit 222 are substantially the same to those of the first body 110, the second body 120 and the energy storage unit 122, which is omitted herein. The difference between the power supply device 200 and the power supply device 100 is that the first circuit board 212a is vertical to the second circuit board 212b.

As shown in FIG. 10, a button 216 is disposed at the outer of the first body 210, and a linkage mechanism 218 is disposed in the first body 210, the linkage mechanism 218 is adapted to fix the second body 220 in the first body 210. When the second body 220 is in the first body 210 and the button 216 is pressed, the button 216 drives the linkage mechanism 218 to push the second body 220 away from the first body 210, and then the user can take out the second body 220 easily.

The power supply device 100 shown in FIG. 7 may include a button 116 similar to the button 216, and it also may include a linkage mechanism similar to the linkage mechanism 218.

Although the present disclosure has been described in considerable detail with reference to certain preferred embodiments thereof, the disclosure is not for limiting the scope. Persons having ordinary skill in the art may make various modifications and changes without separating from the scope. Therefore, the scope of the appended claims should not be limited to the description of the preferred embodiments described above.

What is claimed is:

1. A power supply device operated with a first electronic device or a second electronic device, comprising:
a first body includes an opening, two opposite side plates and an adapter module, wherein each of the side plate includes a beveling configured to form a concave notch, and the concave notches are configured to allow a first power cable, a second power cable, and a signal cable to extend out the first body, the adapter module disposed between the two side plates and electrically connects to the first electronic device, the opening divides into a first part and a second part along a first axis, the shape of the first part is asymmetrical to the shape of the second part; and
a second body including an energy storage unit and a protection circuit, wherein the energy storage unit electrically connects to the adapter module to supply power to the first electronic device, when the second body detaches from the first body, the energy storage unit supplies power to the second electronic device, and the protection circuit is adapted to stop supplying power from the energy storage unit when the energy storage unit is abnormal.

2. The power supply device according to claim 1, wherein a cross section of the second body divides to a third part and a fourth part along a second axis, the shapes of the third part and the fourth part are corresponding to shapes of the first part and the second part, respectively.

3. The power supply device according to claim 1, wherein the first electronic device includes a power supply electrically connected to the adapter module, when the power supply stops to provide power to the first electronic device, the energy storage unit provides power to the first electronic device.

4. The power supply device according to claim 1, wherein the first body comprises a button disposed outside and a linkage mechanism disposed inside the first body, and the button drives the linkage mechanism.

5. The power supply device according to claim 1, wherein the second body includes a first adapter plate, the first adapter plate is electrically connected to the energy storage unit and includes a first connecting port, the energy storage unit provides power to the second electronic device via the first connecting port.

6. The power supply device according to claim 1, wherein the second body includes a second adapter plate, the second adapter plate electrically connects to the energy storage unit and includes a second connecting port, the energy storage unit electrically connects to the adapter module via the second connecting port.

7. The power supply device according to claim 6, wherein the second adapter plate includes a power supply port, an external power supply terminal supplies power to the energy storage unit via the power supply port.

8. The power supply device according to claim 1, wherein the adapter module includes a second port, a third port and a fourth port, the first electronic device includes a power supply and a motherboard inside, the second port electrically connects to the power supply via the first power cable, the third port electrically connects to the motherboard via the second power cable, the fourth port electrically connects to the motherboard via the signal cable.

\* \* \* \* \*